(12) United States Patent
Griffin et al.

(10) Patent No.: US 8,690,728 B2
(45) Date of Patent: Apr. 8, 2014

(54) CONTROLLED VEHICLE LAUNCH USING A STEPPED RATIO TRANSMISSION

(75) Inventors: Chad E. Griffin, Pinckney, MI (US); Bradley D. Riedle, Northville, MI (US); Jeffrey M. Jarvi, Plymouth, MI (US); James B. Keyse, Farmington Hills, MI (US); Daniel T. Lin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 13/286,488

(22) Filed: Nov. 1, 2011

(65) Prior Publication Data

US 2013/0109532 A1 May 2, 2013

(51) Int. Cl.
*B60W 10/02* (2006.01)
*B60W 10/04* (2006.01)
*B60W 10/10* (2012.01)

(52) U.S. Cl.
USPC ........................................ 477/77

(58) Field of Classification Search
USPC .............................. 477/70, 77, 79, 80; 74/330
See application file for complete search history.

(56) References Cited

U.S. PATENT DOCUMENTS

| 4,724,723 | A | 2/1988 | Lockhart et al. |
| 5,761,628 | A | 6/1998 | Steeby et al. |
| 6,283,891 | B1 | 9/2001 | Wozniak et al. |
| 6,463,821 | B1 * | 10/2002 | Reed et al. ...................... 74/330 |
| 7,104,922 | B2 | 9/2006 | Dreibholz et al. |
| 7,255,663 | B2 | 8/2007 | Kawamoto et al. |
| 7,326,149 | B2 | 2/2008 | Kraska et al. |
| 7,409,885 | B2 * | 8/2008 | Krauss et al. ................... 74/340 |
| 7,597,020 | B2 * | 10/2009 | Baldwin ..................... 74/336 R |
| 7,630,811 | B2 | 12/2009 | Jiang |
| 7,722,499 | B2 | 5/2010 | Soliman et al. |
| 2005/0072255 | A1 * | 4/2005 | McCrary et al. ................ 74/330 |
| 2006/0122031 | A1 * | 6/2006 | Preisner et al. ................. 477/80 |
| 2007/0202988 | A1 * | 8/2007 | Tanba et al. .................... 477/80 |
| 2009/0118088 | A1 * | 5/2009 | Baldwin ........................ 477/80 |

* cited by examiner

*Primary Examiner* — Sherry Estremsky
(74) *Attorney, Agent, or Firm* — James Dottavio; MacMillan, Sobanski & Todd, LLC

(57) ABSTRACT

A method for controlling a vehicle powertrain during launch includes controlling slip across a first clutch that transmits engine torque through the first clutch and the current gear while a transmission operates in a current gear other than a launch gear, disengaging the first clutch, engaging the launch gear, and controlling slip across a second clutch that transmits engine torque through the second clutch and the launch gear.

17 Claims, 3 Drawing Sheets

CONTROLLED VEHICLE LAUNCH USING A STEPPED RATIO TRANSMISSION

BACKGROUND OF THE INVENTION

1. Field of the Invention

This invention relates generally to a method for controlling a vehicle powertrain during a vehicle launch event using an engine and a stepped ratio transmission.

2. Description of the Prior Art

A powershift transmission is a geared mechanism having two input clutches, which alternately connect a power source, such as an engine to two transmission input shafts.

The transmission produces multiple gear ratios in forward drive and reverse drive though operation of gearing arranged in a dual layshaft configuration between the transmission input and its output. One input clutch transmits torque between the input and a first layshaft associated principally with even-numbered gears; the other input clutch transmits torque between the transmission input and a second layshaft associated principally with odd-numbered gears. The transmission produces gear ratio changes by alternately engaging a first input clutch and running in a current gear, disengaging the second input clutch, preparing a power path in the gearing for operation in the target gear, disengaging the first clutch, engaging the second clutch and preparing another power path in the gearing for operation in the next gear.

Because a dual clutch transmission has no torque converter to provide damping, such transmissions begin and end each gear shift with the holding clutch, i.e., the input clutch through which engine torque is transmitted to the transmission input shaft for the target gear, slipping. To provide acceptable shift quality, it is necessary to maintain the correct slip without excess flare and without locking the holding clutch. At the same time, the input clutches must maintain sufficient torque at the output shaft to provide consistent acceleration before, during and after the shift.

The magnitude slip across the input clutches must be closely controlled.

A vehicle equipped with a dual clutch powershift transmission can be stopped but the gear in which the transmission is operating may not be its launch gear, i.e., first gear. When the driver applies the accelerator pedal to launch the vehicle, an unresponsive undesirable performance feel can be produced.

SUMMARY OF THE INVENTION

A method for controlling a vehicle powertrain during a vehicle launch event includes controlling slip across a first clutch that transmits engine torque through the first clutch and the current gear while a transmission operates in a current gear other than a launch gear, disengaging the first clutch, engaging the launch gear, and controlling slip across a second clutch that transmits engine torque through the second clutch and the launch gear.

The control method combines launching with gear shifting to produce a smooth launch event.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
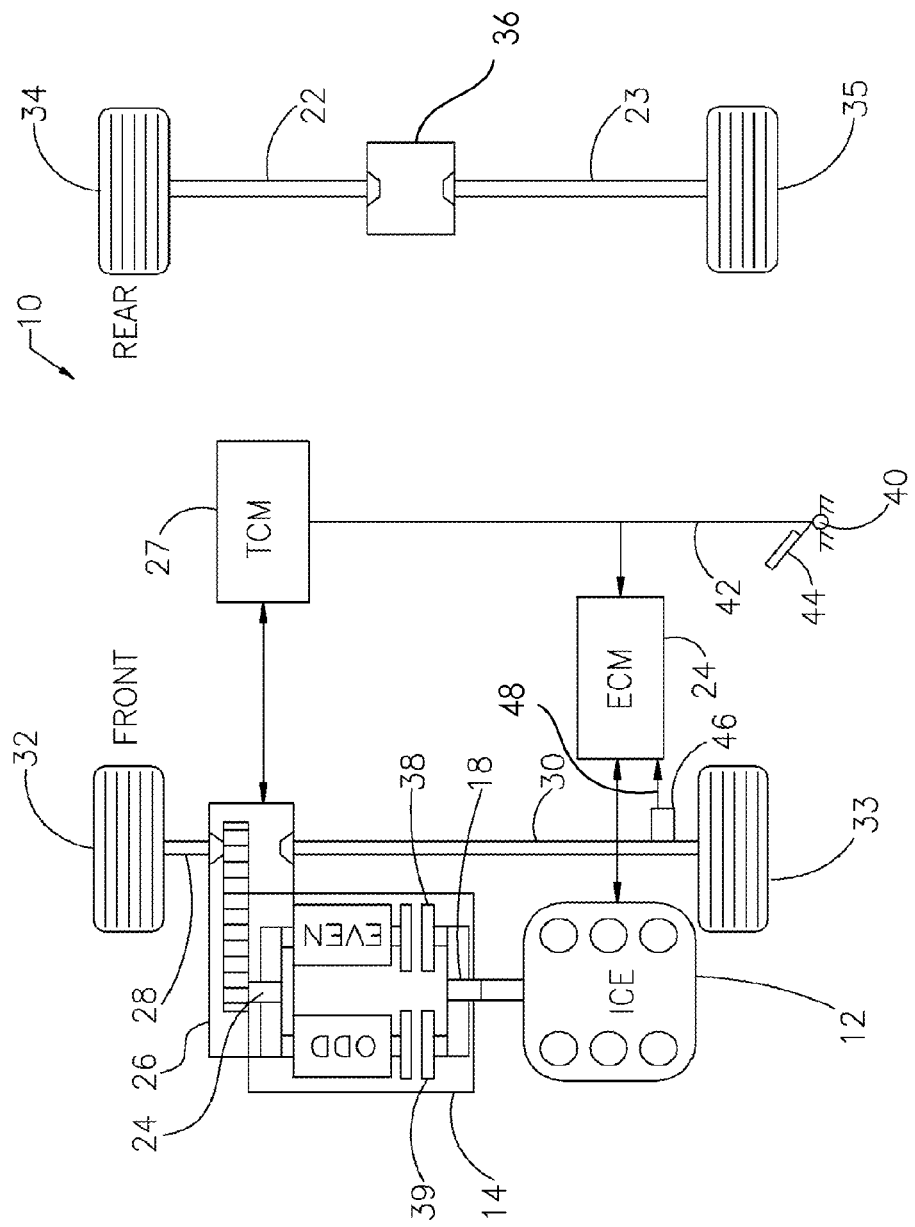
FIG. 1 is a schematic diagram showing an automotive vehicle powertrain.

Referring first to FIG. 1, the powertrain 10 for a motor vehicle includes a first power source 12, such as an internal combustion engine; an automatic transmission 14 producing multiple forward and reverse gear ratios; a transmission input shaft 18 connected to the engine shaft; a transmission output 24, connected through a final drive unit and differential mechanism 26 to the front axles 28, 30; and front wheels 32, 33, respectively driven by the axles shafts 28, 30. In some drive configurations the rear wheels 34, 35 may be driven through a differential mechanism 36 and rear axles 22, 23.

To produce forward or reverse drive, a forward or reverse gear of the transmission must be engaged between input 18 and output 24. The input clutch 38, 39 that is associated with the engaged gear must be engaged to complete a drive path between engine 12, through input shaft 18 and transmission 14 to the vehicle wheels 32, 33.

An electronic engine control module (ECM) 24 controls operation of engine 12. An electronic transmission control module (TCM) 27 controls operation of transmission 14 and the input clutches 38, 39.

A sensor 40 produces a signal 42, transmitted to ECM 24 and TCM 27, representing the extent to which an accelerator pedal 44 is depressed from a reference position. A speed sensor 46 produces a signal 48, transmitted to ECM 24 and TCM 27, representing vehicle speed.

Generally launch gear is low gear, i.e., the forward gear having the greatest speed ratio produced by transmission 14.

When vehicle speed is less than a reference speed, accelerator pedal 44 is depressed, and the launch gear of transmission 14 is not engaged, TCM 27 produces controlled slip in the input clutch 38, 39 through which torque is transmitted in the current gear to the driven wheels 32, 33. This controlled slip allows engine speed to significantly increase beyond the launch gear speed, i.e., the engine speed that would accelerate the vehicle from a stop and produce an ideal vehicle launch that is smooth and without excessive noise, vibration or harshness with the transmission operating in the launch gear. After the launch gear is engaged, a shift from the current gear to the launch gear is produced with significant but controlled slip for the launch gear to launch the vehicle.

Figure 2:
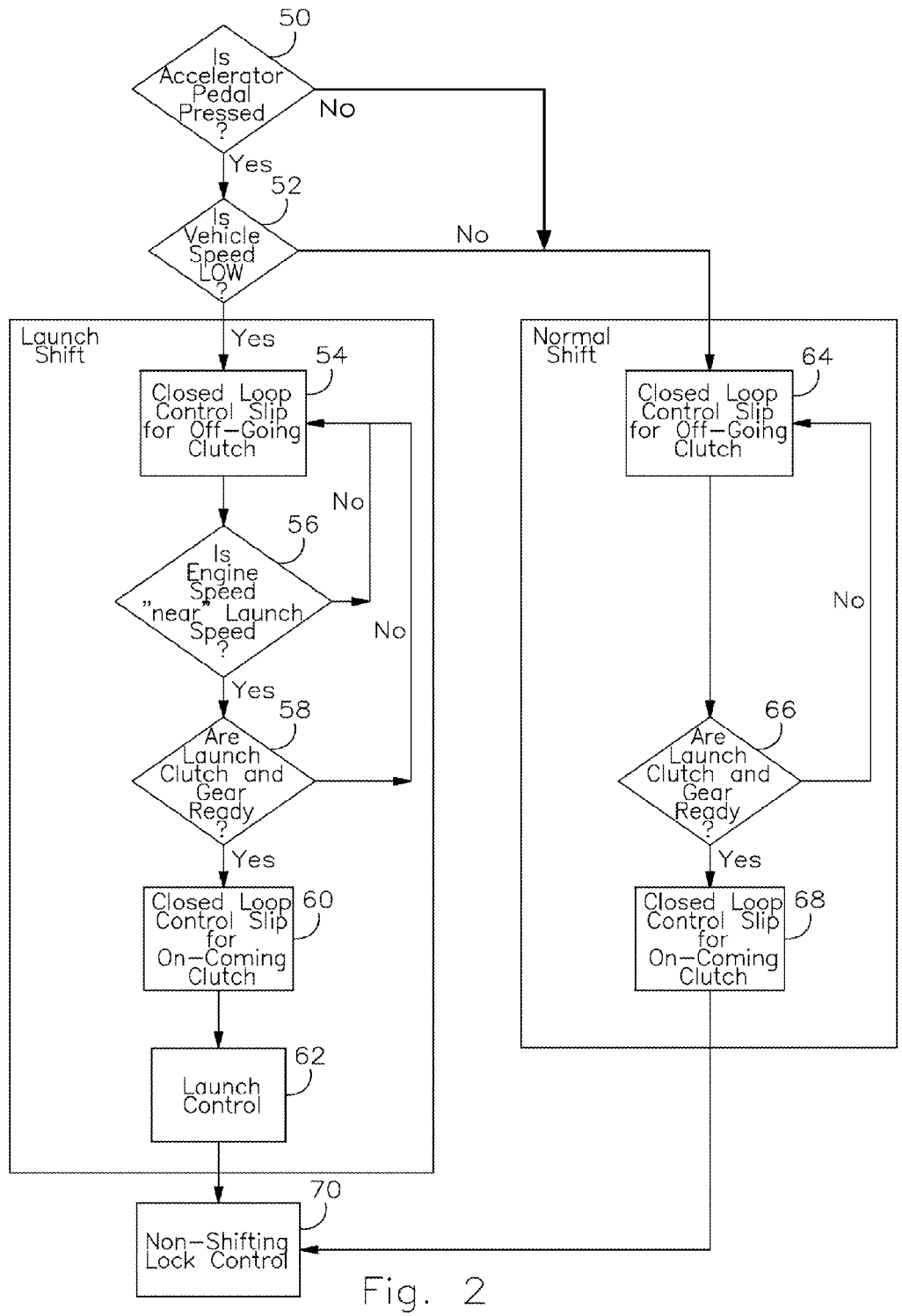
FIG. 2 is a logic flow diagram showing an algorithm for controlling a normal gear shift and launch gear shift from a current gear of the transmission of FIG. 1.

FIG. 2 shows an algorithm for controlling the shift to the launch gear. At step 50 a test is performed to determine whether the accelerator pedal is depressed. If the result of test 50 is true, at step 52 a test is performed to determine whether vehicle speed is less than a reference speed.

If production of the current gear and launch gear requires engagement of the same input clutch 38, 39, the transmission produces a shift from the current gear to another current gear, which requires engagement of the other input clutch 38, 39 than the clutch required to be engaged when the transmission produces launch gear. The off-going clutch is the clutch 38, 39, whose engagement is required for the transmission to operate in and produce the current gear. The oncoming clutch is the clutch 38, 39, whose engagement is required for the transmission to operate in and produce the launch gear.

If the result of test 52 is true, at step 54 closed loop control of slip across the off-going clutch is performed on the basis of the rate of change of engine speed or as a function of accelerator pedal displacement from its reference position. At step 54 TCM 27 issues command signals, which control slip in the off-going input clutch 38, 39, through which engine torque is transmitted in the current gear to the driven wheels 32, 33.

At step 56 a test is performed to determine whether engine speed is within a reference range of launch speed.

If the result of test 56 is true, at step 58 the current gear is disengaged, the off going clutch is released, and a test is performed to determine whether the launch gear is engaged and whether the associated input clutch 38, 39 of transmission 14 through which torque will be transmitted in the launch current gear to the driven wheels 32, 33 is prepared for the vehicle launch.

If the result of either test 56 or 58 is false, control returns to step 54.

If the result of test 58 is true, at step 60 closed loop control of slip across the oncoming clutch 38, 39 is performed as a function of engine speed. At step 60 TCM 27 issues command signals, which control slip across the oncoming input clutch 38, 39, through which engine torque will be transmitted in the launch gear to the driven wheels 32, 33.

At step 62 the ECM 24 and TCM 27 cooperate in launching the vehicle using engine 12 and transmission 14.

If the result of either test 50 or 52 is false, indicating that either the accelerator pedal is not depressed or the vehicle speed is greater than the reference speed, normal shifting is executed under control of the ECM 24 and TCM 27.

At step 64, TCM 27 issues command signals, which control slip in the off-going input clutch 38, 39, through which torque is transmitted in the current gear to the driven wheels 32, 33.

At step 66, a test is performed to determine whether the launch gear is engaged and whether the associated input clutch 38, 39 of transmission 14 through which torque will be transmitted in the launch current gear to the driven wheels 32, 33 is prepared for a gear shift.

If the result of test 66 is false, control returns to step 64.

At step 68, TCM 27 issues command signals, which control slip in the oncoming input clutch 38, 39, through which torque will be transmitted in the oncoming gear to the driven wheels 32, 33.

At step 70, the oncoming input clutch 38, 39 is locked or fully engaged.

Figure 3:
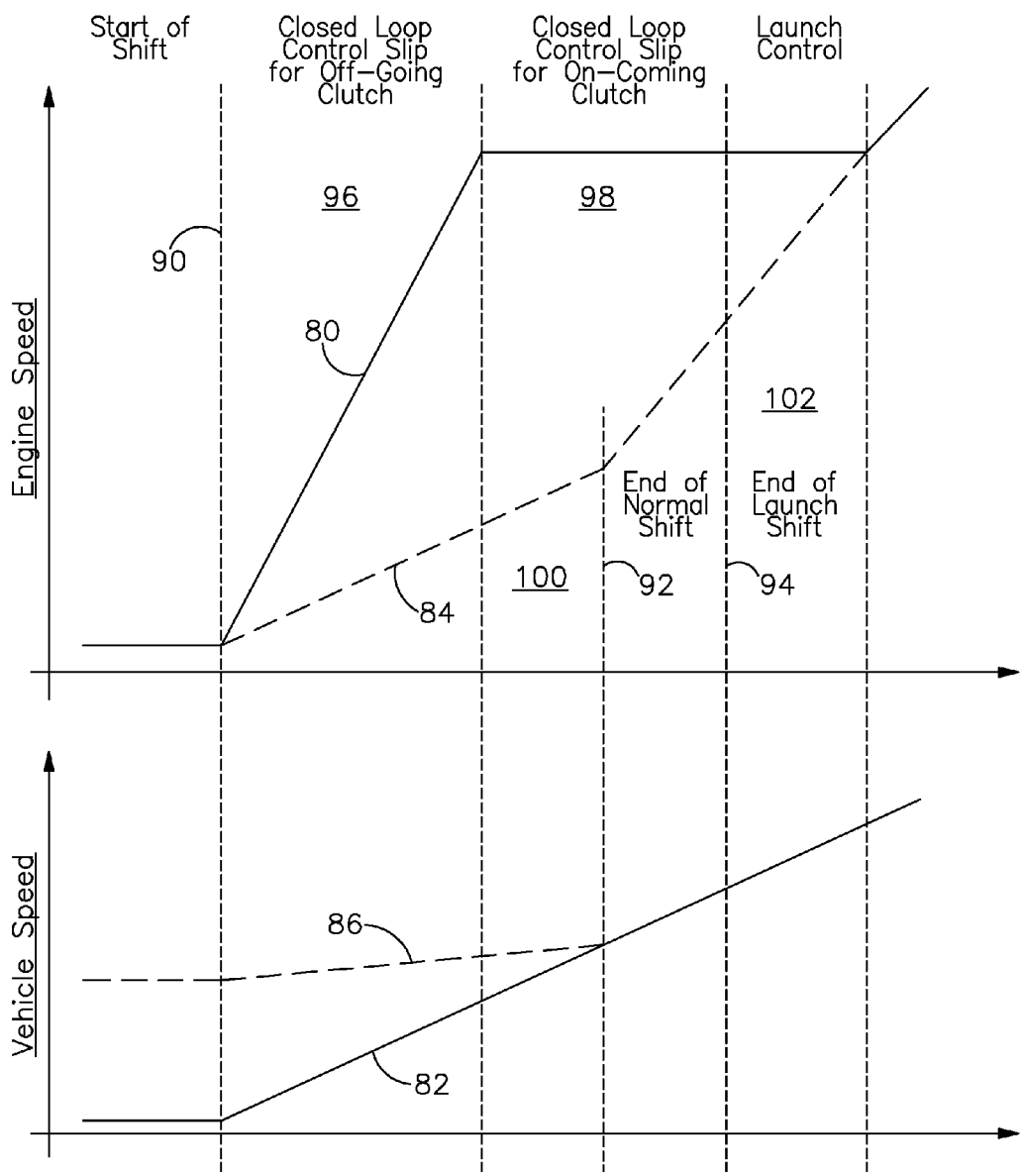
FIG. 3 shows the variation of engine speed and vehicle speed during a launch shift and normal shift.

FIG. 3 shows the variation of engine speed 80 and vehicle speed 82 during a launch shift, and engine speed 84 and vehicle speed 86 during a normal shift. Each shift starts at 90. The normal shift ends at 92 and the launch shift ends at 94.

For the launch shift, closed loop control 54 of slip in the off-going input clutch 38, 39 occurs during period 96, closed loop control 60 of slip in the oncoming input clutch 38, 39 occurs during period 98, and launch control 62 occurs during period 102.

For the normal shift, closed loop control 64 of slip in the off-going input clutch 38, 39 occurs during period 96, and closed loop control 68 of slip in the oncoming input clutch 38, 39 occurs during period 100.

For the launch shift, engine speed 80 increases rapidly during closed loop control 54 of slip in the off-going input clutch 38, 39, and remains substantially constant to the end of the shift 94 during closed loop control 60 of slip in the oncoming input clutch and during launch control 62.

For the normal shift, engine speed 84 increases at a lower rate during closed loop control 64 of slip in the off-going input clutch 38, 39, and during closed loop control 68 of slip in the oncoming input clutch to the end of the shift 92. Thereafter, engine speed increases more rapidly.

For the launch shift, vehicle speed 82 increases rapidly during closed loop control 54 of slip in the off-going input clutch, during closed loop control 60 of slip in the oncoming input clutch and during launch control 62.

For the normal shift, vehicle speed 86 increases less rapidly during closed loop control 64 of slip in the off-going input clutch, and during closed loop control 68 of slip in the oncoming input clutch to the end of the shift 92. Thereafter, engine speed increases at a higher rate.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle powertrain, comprising:
   (a) while a transmission operates in a current gear other than a launch gear, controlling slip across a first clutch that transmits engine torque through the first clutch and the current gear;
   (b) disengaging the first clutch;
   (c) engaging the launch gear;
   (d) controlling slip across a second clutch that transmits engine torque through the second clutch and the launch gear.

2. The method of claim 1, wherein step (a) further includes controlling slip across the first clutch on the basis of a rate of change of engine speed.

3. The method of claim 1, wherein step (a) further includes controlling slip across the first clutch such that engine speed increases along an ascending ramp.

4. The method of claim 1, wherein step (b) further includes disengaging the current gear.

5. The method of claim 1, wherein step (d) further includes controlling slip across the second clutch as a function of engine speed.

6. The method of claim 1, wherein step (d) further includes controlling slip across the second clutch such that engine speed is substantially constant.

7. A method for controlling a vehicle powertrain, comprising:
   (a) while a transmission operates in a current gear other than a launch gear, increasing vehicle speed by controlling slip across a first clutch that transmits engine torque through the first clutch and the current gear;
   (b) disengaging the first clutch;
   (c) engaging the launch gear;
   (d) increasing vehicle speed by controlling slip across a second clutch that transmits engine torque through the second clutch and the launch gear.

8. The method of claim 7, wherein step (a) further includes controlling slip across the first clutch on the basis of a rate of change of engine speed.

9. The method of claim 7, wherein step (a) further includes controlling slip across the first clutch such that engine speed increases along an ascending ramp.

10. The method of claim 7, wherein step (b) further includes disengaging the current gear.

11. The method of claim 7, wherein step (d) further includes controlling slip across the second clutch as a function of engine speed.

12. The method of claim 7, wherein step (d) further includes controlling slip across the second clutch such that engine speed is substantially constant.

13. A method for controlling a vehicle powertrain, comprising:
   (a) while a transmission operates in a current gear other than a launch gear, increasing engine speed in response to an accelerator pedal input and controllably allowing slip across a first clutch that transmits engine torque through the first clutch and the current gear;
   (b) disengaging the first clutch;
   (c) engaging the launch gear;
   (d) increasing engine speed by controlling slip across a second clutch that transmits engine torque through the second clutch and the launch gear.

14. The method of claim 13, wherein step (a) further includes controlling slip across the first clutch on the basis of a rate of change of engine speed.

15. The method of claim 13, wherein step (b) further includes disengaging the current gear.

16. The method of claim 13, wherein step (d) further includes controlling slip across the second clutch as a function of engine speed.

17. The method of claim 13, wherein step (d) further includes controlling slip across the second clutch such that engine speed is substantially constant.

* * * * *